June 14, 1966     HIROMITSU UENO     3,255,980
SPINNING REEL
Filed Nov. 20, 1963
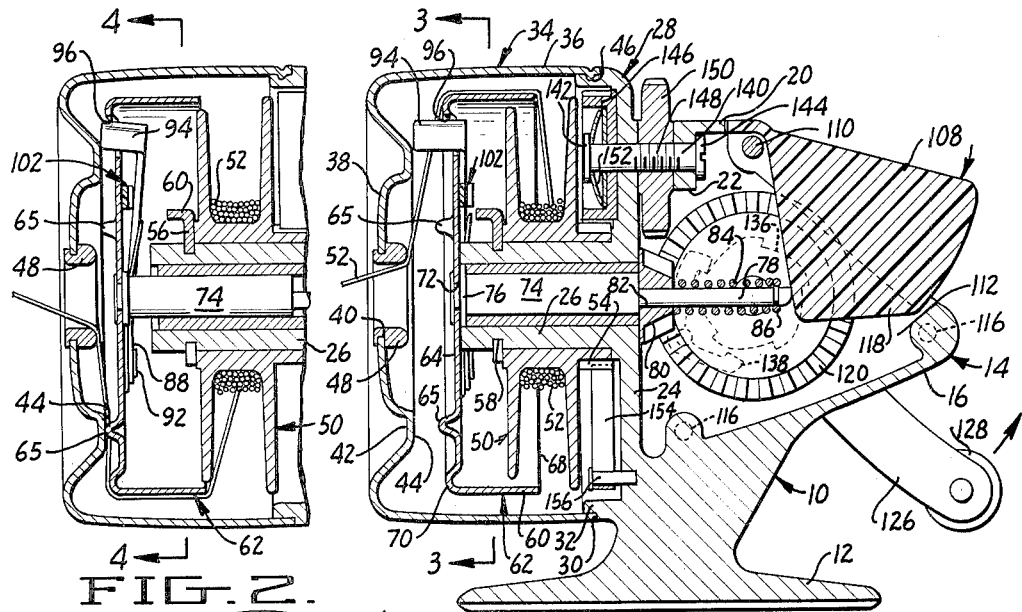
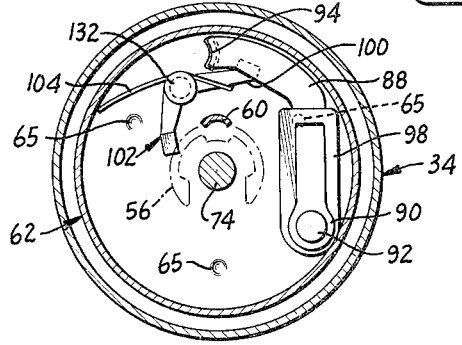
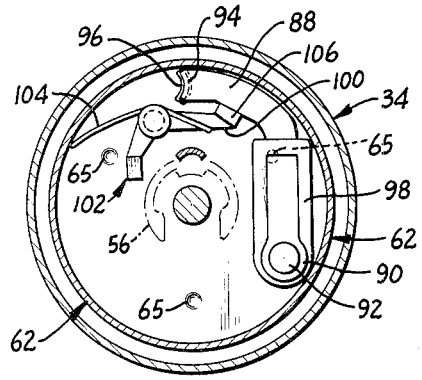
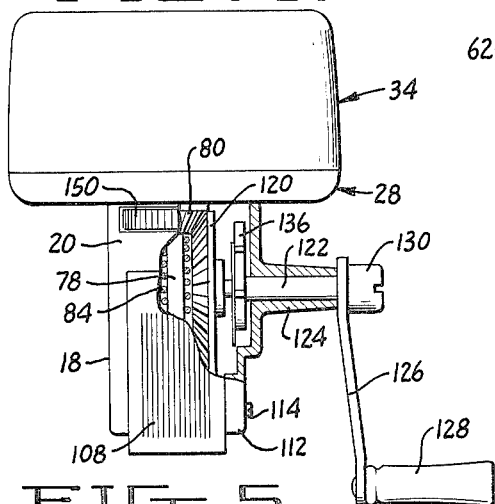
INVENTOR.
HIROMITSU UENO
BY Naylor & Neal
ATTORNEYS 3,255,980
SPINNING REEL
Hiromitsu Ueno, 4029 Shiinamaohi, 7 Chome
Toashima-ku, Tokyo, Japan
Filed Nov. 20, 1963, Ser. No. 324,962
10 Claims. (Cl. 242—84.2)

This application is a continuation-in-part of co-pending application, Serial No. 253,861, filed January 25, 1963, now abandoned.

The subject invention relates broadly to fishing reels of the spinning, or normally fixed spool type; more particularly, the invention relates to improvements in such reels, and, more specifically, the improvements forming the subject matter of the subject invention comprise a line pick-up finger which is different in construction, mode of operation, and which produces new and improved results, in contrast to the line pick-up fingers heretofore employed in reels of this general type.

Reels of the general type with which the subject invention is concerned are characterized by the following structure and mode of operation: the provision of a stationary casing which encloses a normally stationary spool on which the fishing line is disposed; which encloses a spooling member disposed between the spool and the forward end of the case, said member being mounted for axial movement away from and then towards the spool and also for rotative movement; and which is provided centrally of the forward end thereof with a line guide eyelet through which the fishing line is paid out and retrieved; a line pick-up finger carried by the spooling member which extends across the path of the line as the latter leads from the spool over the lateral periphery of the spooling member and through said line guide eyelet; means responsive to axial movement of the spooling member away from the spool to cause the line pick-up finger to be withdrawn from said position where it lies across the path of the line, said axial movement of the spooling member away from the spool also serving to move the lateral periphery of the spooling member away from its retracted position where it partially overlies the spool, thereby enabling the line to be cast without the spooling member offering any drag or interference to the feeding off of the line from the spool during the casting operation; and means responsive to the return axial movement of the spooling member toward the spool and subsequent rotative movement of the spooling member to project the line pick-up finger outwardly of the spooling member and across the path of the line, as aforesaid, with said pick-up finger being operable during subsequent rotation of said spooling member to wind the line back onto the spool, thereby effecting retrieval of the line.

Prior to the subject invention, fishing reels of the described type which were known to the art and sold in commerce have been uniformly characterized by a line pick-up finger which extended radially of the spooling member and which was shiftable from an inoperative position wherein it was disposed within the lateral periphery of the spooling member to an operative position wherein it projected through an aperture in the lateral periphery of the spooling member.

Reels of this specific type, i.e., in which radially disposed line pick-up fingers are employed, suffer a drawback by virtue of this manner of disposition of the pick-up finger and its mode of operation. Thus, when the time comes to retrieve the line the line is usually in a somewhat slackened condition. If the rotation of the spooling member is commenced while this condition obtains, the line can escape from the controlling effect of the pick-up finger by moving outwardly of the finger and free of it into the space between the end of the finger and the inside wall of the outer casing of the reel. If this occurs and the spooling member is rotated, the line will become snarled or entangled within the case. In order to protect against this, it is necessary to flip the fishing rod upward to convert the line from a slackened to a tautened condition.

An important object and advantage of the subject invention is the provision of a line pick-up finger which is axially movable into and out of the face plate of the spooling member and which, because of this particular orientation and the mode of operation of a line pick-up finger so oriented, insures that a slackened line will not escape from the control effect of the line pick-up finger.

A further object of the invention is the provision of a line pick-up finger in a reel of the described type which is biased to a projected rather than a retracted position.

Another object of the invention is the provision in a reel of the described type of an improved line snubbing system, whereby the line snubbing effect is obtained without imparting pressure, and thereby consequent damage, to the line. In the reel of the present invention, when the spooling member is at its position of closest approach to the cover, a space remains between an inwardly directed annular surface portion of the cover and the end plate of the spooling member, said space being greater than the thickness of the line. Extending forwardly into this space is a plurality of small round protuberances formed in the end plate of the spooling member. These protuberances may engage the inwardly directed annular surface portion of the cover when the spooling member is advanced to its maximum position of approach to the cover. At this point in the sequence of operation of the reel further spinning off of the line is prevented by the combined effect of the following: the means provided to limit rotation of the spooling member to only one direction; the resistance to spooling member rotation which is present even when the reel is set for minimum drag condition; and the friction imparted to the line by one of the mentioned small protuberances formed on the spooling member end plate. The small round protuberances function as line entrapment means operable to frictionally engage the line as the line tends to further spin off the line spool, and not in the manner of the line snubbing means hitherto employed in reels of the subject type, i.e., where the line is snubbed by a clamping action applied to it from two sides, at one side by the reel cover and at the other side by the spooling member. The subject improved line snubbing means is thus effective to prevent damage to or deformation of the line because of flattening of the line by transverse clamping type of snubbing action.

These and other objects and advantages of the invention will be apparent from the following description taken in conjunction with the drawings forming part of this specification, and in which:

FIG. 1 is a view in side elevation, some of the parts being shown in section, of the spinning reel embodying the invention;

FIG. 2 is a view similar to the left hand portion of FIG. 1, but showing the parts in line-snubbing position rather than, as in FIG. 1, in line re-spooling position;

FIG. 3 is a sectional view, reduced in size, taken along lines 3—3 of FIG. 1;

FIG. 4 is a sectional view, reduced in size, taken along lines 4—4 of FIG. 2; and FIG. 5 is a top plan view, reduced in size and partially broken away, of the reel shown in FIG. 1.

Referring to the drawings, the subject reel comprises in the preferred form thereof herein shown, a unitary casting, indicated generally at 10, forming: a rod mount, or tang, 12; a semicasing 14 having a lower wall 16, side wall 18, an upper transverse web 20 having a depending flange 22, an annular plate 24 having an outwardly directed central sleeve 26 and a peripheral flange 28 having formed thereon a radial shoulder 30 and an inset cylindrical surface 32.

A one-piece cover 34 having a generally cylindrical side wall 36 and a forward wall 38, the latter having a central aperture 40 and an annular depressed portion 42 providing at the inside of the cover an annular rib having a generally flat surface 44, is removably attached to flange 28 of plate 24 as by bayonet joinder means 46, complemental portions thereof being formed in the cover 34 and surface 32 of flange 28. An inwardly directed line guide ring 48 is attached to the cover 34, being crimped over the edge of cover aperture 40.

A spool 50, upon which the fishing line 52 is wound, is rotatably mounted on sleeve 26, said spool 50 being provided at its inner end with a gear 54 for purposes hereinafter described. The spool 50 is secured against endwise movement on sleeve 26 by a yoke-shaped (see FIGS. 3-4) snap ring 56 which is removably disposed within a peripheral slot 58 formed in sleeve 26. The snap ring 56 is provided with a forwardly directed tab 60.

A spooling member 62 comprised of end plate 64, a rearwardly directed flange 66 terminating in edge 68, a rounded peripheral portion 70 joining plate 64 and flange 66, and a central aperture 72 in plate 64, is secured to a shaft 74 against shaft flange 76, as by the peening of the forward end of said shaft against plate 64. The end plate 64 of the spooling member has formed therein a plurality of small round protuberances 65. These protuberances are angularly spaced apart and are directed toward the annular portion 42 of cover 34.

Shaft 74 is provided with an integral extension 78 of reduced diameter. Secured to this shaft extension against rotation thereon but for slidable movement thereon by means comprising a flattened side on said extension is a bevel gear 80 having an axial passage 82 which is complemental to the cross-sectional form of said extension 78. A spring 84 sleeved over extension 78 bears against bevel gear 80 and against a retainer ring 86, the latter being removably disposed within a peripheral groove formed in extension 78.

The spooling member 62 is provided with line pick-up or retrieval means comprising a lever arm 88 having an apertured end 90 loosely fitting about the shank of a rivet 92, the rivet shank extending through an opening, not shown, in plate 64 and being crimped about the edge of said opening and thereby being fixedly secured to said plate, a finger 94 carried by arm 88 and adapted to be protruded through a slot 96 formed in plate 64 and retracted through said slot, a leaf spring 98 of the closed yoke form having an end mounted on the shank of rivet 92 between plate 64 and the end 90 of lever arm 88 and having its other end disposed at the other side of lever arm 88 in pressing engagement with said arm. The function of leaf spring 98 is to tend to maintain lever arm 88 and finger 94 in the position shown in FIG. 1.

Lever arm 88 and finger 94 are moved from the FIG. 1 position to the retracted position of FIG. 2 by movement of the spooling member 62 toward the left from its FIG. 1 position. A very slight movement of the spooling member in this direction engages the outer end of finger 94 with the rearwardly projecting internal surface portion 44 of cover 34. Further movement of the spooling member toward the left causes arm 88 to be rocked backward against the resistance of leaf spring 98 to cause finger 94 to be retracted through slot 96. As the lever arm 88 is thus yieldingly moved, relatively, away from plate 64 of spooling member 62, the end 100 of crank arm 102 (FIGS. 3-4) is snapped between arm 88 and plate 64 by hair spring 104 to maintain the finger 94 in the retracted condition of FIG. 2. The end 100 of crank arm 102 is provided with a tapered terminal portion 106 which is adapted to facilitate the movement of crank arm end 100 between the lever arm 88 and plate 64.

Means for moving the spooling member 62 toward the left, as described, comprise a thumb lever 108 pivotally disposed upon a bearing shaft 110, the latter being provided with a bolt head at one end and a threaded terminal portion at the other end, the same being thereby adapted to aid in the securing of end plate 112 to the semicasing 14. A pair of bolts 114 extending through the end plate 112 into threaded engagement with internally threaded bores 116 defined in bosses forming part of the semicasing also serve to removably secure the end plate 112 to the semicasing 14. The thumb lever 108 is provided with a centrally located dependent web 118 which rests against the outer end of the shaft extension 78. By depressing the thumb lever 108 to impart endwise movement to the shaft 74 and shaft extension 78 against the resistance of spring 84, the spooling member is moved to the left in the manner described to thereby move the line pick-up finger 94 to the retracted position of FIG. 2. Release of the lever 108 enables the spring 84 to return the shaft 74 and the spooling member 62 to the position shown in FIG. 1, but the line pick-up finger will remain in its retracted position until a degree of rotative movement is imparted to shaft 74 and the spooling member 62 through the bevel gear 80.

Such rotative movement of the bevel gear is caused by rotating bevel gear 120 which is in mesh therewith, gear 120 being secured to the end of shaft 122, the latter being supported for rotation in a journal extension 124 formed on end plate 112. A crank arm 126 having a handle 128 is keyed to shaft 122 and removably secured on said shaft by an internally threaded cap 130 attached to the threaded end of the shaft.

Rotative movement of the crank in the direction indicated by the directional arrow in FIG. 1 will cause rotative movement of the spooling member 62 in the direction indicated by the directional arrows in FIGS. 3 and 4. Since crank arm 102 is carried by the spooling member, being pivotally mounted on the shank of a rivet 132 carried by plate 64, a slight degree of rotative movement of the spooling member will bring the end 134 of crank arm 102 into engagement with the forwardly directed tab 60 of yoke-shaped snap ring 56, and further rotative movement of the spooling member will cause tab 60 to rotate crank arm 102 in a clockwise direction, with reference to FIGS. 3 and 4, to rotate the end 100 of the crank arm out from beneath lever arm 88 against the resistance of the hair spring 104, thus allowing leaf spring 98 to snap the lever arm 88 against the plate 64 and cause the line pick-up finger 94 to be protruded through slot 96 formed in plate 64.

Further rotation of the spooling member in the same direction, after a cast has been made and after the pick-up finger has been moved from the retracted to the projected position of FIG. 1, results in a lay-up of the line 52 by the finger 94 and the spooling member 62 onto the normally stationary spool 50.

Means are provided to limit the direction of permissible rotation of the crank 126 and shaft 122 to that indicated by the directional arrow in FIG. 1, said means comprising a ratchet wheel 136 fixedly secured to shaft 122 and a double-ended rocker pawl 138 pivotally mounted on a pin carried by side plate 112.

A line-snubbing arrangement is provided whereby unwanted feed of the line off the spool 50, after the retraction of finger 94 and prior to the deliberate casting of the line, and also to control the length of pay out of the line during casting, is provided, said means comprising the inwardly projecting line guide ring 48. When the thumb lever 108 is pushed downwardly, the pick-up finger 94 strikes the annular portion 44 of cover 34, thereby causing the finger 94 to move through slot 96 and enabling the lever arm 88 to be locked by the end 100 of the crank arm 102, and this retraction of the pick-up finger 94 leaves an axial space between the end plate 64 of the spooling member and the annular portion 44 of cover 34 which allows the line to freely peel off between plate 64 and cover portion 44. However, free peeling off of the line is prevented by the head of one of the small round protuberances 65 formed on the end plate 64. During the casting maneuver, i.e., during the course of the arm action followed in a casting maneuver, the pressure on the thumb lever 108 is relaxed to permit the spring 84 to move the spooling member 62 away from the end of cover 34, thereby freeing the line from its snubbed condition. A reapplication of the manual pressure on thumb lever 108 enables a resnubbing of the line to control the length of the cast.

As previously indicated, the return of the spooling member to the FIG. 1 position from the FIG. 2 position followed by rotative movement of the spooling member causes the pick-up finger 94 to be projected to its FIG. 1 position to enable the line to be reeled in.

While the spool 50 is normally stationary on the sleeve shaft 26, it may rotate to permit the paying out of line when the finger 94 is in the extended position of FIG. 1, whether the spooling member is stationary or is being rotated for line retrieval purposes, in the event that the drag on the line urges such movement of the spool in a direction to enable the paying out of the line. Brake means are provided and such means may be nicely adjusted to hold the spool against rotative movement but to permit rotation of the spool when the drag on the line approaches the load limit characteristic of the line. The brake means herein provided comprise: a stud 140 supported for endwise movement in flange 22 and a plate 24; a flange 142 at the end of the stud 140; a hollow face gear 146 freely sleeved on stud 140 and in mesh with gear 54 of the spool 50; a section of threads 148 formed on the peripheral surface of stud 140; a knurled control wheel 150 mounted on stud 140 and internally threaded to be in threaded engagement with thread section 148; and a spring washer 152 maintained by stud flange 142 in engagement with back-up washers which bear against the inner face of the hollow gear 146.

It will be appreciated that rotative movement of the control wheel 150 in one direction will cause the stud to be axially moved to the right, as viewed in FIG. 1, to cause the stud head 142 to increase its frictional engagement with the hollow face gear 146 through the interposed washer means, including 152, thereby increasing the resistance to rotation of the spool 50 by virtue of the engagement between gear elements 54 and 146, and that rotation of the control wheel in the other direction will cause axial movement of stud 140 to the left, thereby decreasing the drag on the spool 50.

The subject reel further embodies click producing means comprising a flexible finger 154, the free end of which engages between the teeth of spool gear 54 as the spool is rotated, thereby producing a clicking sound having a frequency in proportion to the rate of rotation of the spool, and the end of which is affixed to a stud 156 attached to plate 24.

An important feature of the subject reel is the provision of a line pick-up finger 94 which moves from an inactive to active position in a direction which is essentially parallel to the axis of rotation of the spooling member, rather than radially with respect to the spooling member as has been the practice in the art concerning reels of this specific type up to this point. With line pick-up fingers of the radially movable type of the prior art, snarling and tangling of the line frequently occurs, as, for example, upon the occurrence of a sudden slackening in the line the line may fall away from the drum portion of the spooling member toward the outer case and thereby escape the control effect of the radial pick-up finger. In such event, the spooling member is generally rotated a number of times after this occurs, with the consequence that the line becomes fouled within the case. On the other hand, with the axially movable line pick-up finger 94, the sudden occurrence of a slack condition in the line does not result in the loss of control of the line by the pick-up finger because the sole avenue for escapement of the line from the control of the pick-up finger, i.e., the radial space between the outer end of the finger and the surface 44 of the cover, is disposed essentially normal to the direction of application of the negative force, i.e., the slackening applied to the line, rather than, as is the case with the radially directed pick-up fingers of the prior art, parallel to the direction of application of this negative force. Stated otherwise, it is much easier for such a slackened line to move away from the drum portion of the spooling member toward the case and thereby escape the radial pick-up finger than it is for the slackened line to be moved outwardly into parallelism with the space between the outer end of the pick-up finger 94 and the surface 44.

While a preferred form of the reel embodying the invention has been shown and described, it will be understood that the described and illustrated structure is subject to modification in accordance with the spirit of the invention and the rule of equivalency in the light of the scope of the appended claims.

What is claimed is:

1. In a spinning reel comprising a shaft, a line spool and means mounting the same concentrically of said shaft to permit rotative movement and inhibit axial movement of the spool, a spooling member mounted on said shaft adjacent one side of said spool, means supporting said shaft for rotational and axial sliding movement including an end plate located adjacent the other side of said spool, a cover attached to said end plate and having a forward wall with a centrally disposed line guide eyelet, means for axially sliding said shaft and said spooling member toward the forward wall of said cover, biasing means for returning said shaft and spooling member to dispose the latter in its initial position adjacent said spool, and means for rotating said shaft: the improvement therein comprising a line pick-up finger carried by said spooling member and mounted for movement inwardly and outwardly of said spooling member generally parallel to the axis of rotation, means biasing said finger outwardly of said spooling member to a line pick-up position between said spooling member and the forward wall of said cover, means comprising the forward wall of said cover operable to yieldingly move said finger inwardly of said spooling member when the latter is moved adjacent said forward wall, holding means carried by said spooling member operable in response to the movement of said finger inwardly of said spooling member to hold said finger in said inwardly disposed or non-pick-up position, said last-mentioned means being operable to so hold said finger during the course of return of said spooling member to its initial position, and release means for said finger disposed between said spooling member and said spool and relatively stationary with respect to said spooling member adapted to deactivate said holding means when said spooling member is subsequently rotated in its initial position to enable the biasing means for said finger to move said finger outwardly of said spooling member to said line pick-up position.

2. The improvement of claim 1 including an annular surface portion defined at the inside of the forward wall of said cover, said surface portion being disposed opposite the outer end of said finger and being adapted to be engaged by the outer end of said finger to effect movement of said finger relative to said spooling member to the non-pick-up position, the outer end of said finger being disposed closely adjacent said surface portion when said spooling member is in said initial position and said finger is disposed in its line pick-up position.

3. The improvement of claim 2, the outer end of said finger being provided with an elongated outer edge which is substantially parallel with said annular surface when said finger is in its line pick-up position.

4. The improvement of claim 3, including a fishing line carried by said line spool, said line having a portion extending inwardly of said cover between said spooling member and the line guide eyelet of said cover, the included angle between the plane in which the outer edge of said finger lies, when the finger is in its line pick-up position and the spooling member is in said initial position, and the axis of rotation of said shaft, said angle being measured at that side of the point of intersection of said plane and said axis at which the line spool is disposed, being substantially greater than the corresponding included angle between said axis and the plane in which lies that portion of fishing line extending between said spooling member and the line guide eyelet of said cover.

5. The improvement of claim 4, said spooling member having formed therein at least one small round protuberance directed toward said annular surface portion of said cover and adapted to prevent free peel off of said fishing line by obstructing the peel off passageway defined axially between said spooling member and said annular surface portion when said spooling member is moved to the full extent outwardly toward the face portion of said cover, whereby snubbing control is effected over said fishing line.

6. The improvement of claim 5, said second mentioned included angle being substantially less than 90°.

7. In a spinning reel, the combination comprising an end plate, a tubular bearing attached to said plate and extending from the forward face of said plate, a line spool sleeved on said bearing, means inhibiting axial movement of said spool on said bearing comprising said end plate and a stop member attached to said bearing adjacent the forward face of said spool, a shaft rotatably and axially slidably disposed in said bearing, a spooling member having an annular face element carrying a rearwardly directed flange element, attached to said shaft, an annular line guide eyelet and means supporting said eyelet in forwardly spaced relation to said spooling member and in axial alignment with said shaft, spring means biasing said spooling member rearwardly toward the forward end of said bearing to normally dispose said member in position for spooling, means for moving the shaft and spooling member forward toward said eyelet, means for driving said shaft in rotation, a line pick-up finger, carrier and biasing means disposed at the rearward side of the face element of the spooling member to support said finger adjacent the flange element of said member and to project it generally axially and forwardly through the face element thereof, means formed on the support means for said eyelet operable upon movement of the spooling member toward the eyelet to press the finger back through the face element of the spooling member to an inoperative position with respect to the line pick-up function of said finger, a spring biased pawl rotatably mounted at the rearward side of the spooling member face element and operable upon the pressing back of said finger to swing between the spooling member face element and the carrier means for said finger and maintain said finger in its inoperative position, and means comprising a crank arm attached to said pawl and a forwardly directed tab on said stop member operable upon return movement of the spooling member toward the forward end of said bearing and subsequent rotative movement of the spooling member to reversely swing said pawl and cause said carrier and biasing means to forwardly project the finger through the face element of the spooling member.

8. The combination of claim 7, said means formed on the support means for said eyelet comprising an annular surface portion, said combination further including a plurality of small round and angularly spaced protuberances formed in the face element of said spooling member and directed toward said annular surface portion, said protuberances being adapted to obstruct the line peel off space between said annular surface portion and said spooling member when said shaft and spooling member are moved to their maximum degree toward said annular surface portion, whereby a snubbing control over said line is effected.

9. In a spinning reel, the combination comprising a frame including an end plate and an elongated tubular bearing, a line spool mounted concentrically with respect to the bearing, a spooling member, a cover attached to said end plate and having a forward wall with a centrally disposed line guide eyelet, shaft means mounted in and extending out of said bearing, said shaft means being rotatable and axially slidable in said bearing and carrying said spooling member concentric thereto adjacent said bearing, a finger and means mounting the same for two-way movement through said spooling member in a direction generally parallel to the axis of rotation of said spooling member, means to project the finger to a predetermined extent through said member, means comprising the forward wall of said cover responsive to axial movement of said member away from said bearing to retractively move said finger into said member, means responsive to the retractive movement of said finger into said member to hold said finger in retracted position, and means responsive to axial movement of said member toward said bearing and rotative movement of said member to disable said holding means and activate said projecting means.

10. In a spinning reel, the combination comprising a frame including an end plate end a tubular bearing, a spooling member, a cover attached to said end plate and having a forward wall with a centrally disposed line guide eyelet, shaft means mounted in and extending out of said bearing, said shaft means being rotatable and axially slidable in said bearing and carrying said spooling member concentric thereto adjacent said bearing, a finger and means mounting the same for two-way movement through said spooling member in a direction generally parallel to the axis of rotation of said spooling member, means to project the finger to a predetermined extent through said member, means comprising the forward wall of said cover for retractively moving said finger into said member, means for holding said finger within said member in retracted position, and means responsive to rotative movement of said member to disable said holding means and activate said projecting means.

References Cited by the Examiner

UNITED STATES PATENTS

| 2,652,990 | 9/1953 | Ferguson | 242—84.2 |
|---|---|---|---|
| 2,711,292 | 6/1955 | Taggart et al. | 242—84.21 |
| 2,911,165 | 11/1959 | Sarah | 242—84.2 |
| 3,062,473 | 11/1962 | Chapin | 242—84.2 |
| 3,108,762 | 10/1963 | Murvall | 242—84.2 |
| 3,128,059 | 4/1964 | Holahan | 242—84.2 |
| 3,152,771 | 10/1964 | Maury | 242—84.2 |
| 3,176,930 | 4/1965 | Miller et al. | 242—84.2 |

FOREIGN PATENTS 760,981   11/1956   Great Britain.

MERVIN STEIN, *Primary Examiner.*

B. S. TAYLOR, *Assistant Examiner.*